(12) United States Patent
Carlson et al.

(10) Patent No.: US 7,742,640 B1
(45) Date of Patent: Jun. 22, 2010

(54) REDUCTION OF BACKGROUND CLUTTER IN STRUCTURED LIGHTING SYSTEMS

(75) Inventors: Jeffrey J. Carlson, Albuquerque, NM (US); Michael K. Giles, Las Cruces, NM (US); Denise D. Padilla, Albuquerque, NM (US); Patrick A. Davidson, Jr., Albuquerque, NM (US); David K. Novick, Albuquerque, NM (US); Christopher W. Wilson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 915 days.

(21) Appl. No.: 11/580,572

(22) Filed: Oct. 13, 2006

Related U.S. Application Data

(60) Provisional application No. 60/838,603, filed on Aug. 18, 2006.

(51) Int. Cl.
*G06K 9/34* (2006.01)
(52) U.S. Cl. ..................................... 382/173
(58) Field of Classification Search ................ 382/100, 382/149, 154, 173, 312; 348/42, 86; 356/602, 356/603; 250/208.1, 559.23, 559.31
See application file for complete search history.

(56) References Cited

U.S. PATENT DOCUMENTS

| 4,634,879 A | 1/1987 | Penney |
| 4,731,853 A | 3/1988 | Hata et al. |
| 5,546,189 A | 8/1996 | Svetkoff et al. |
| 5,949,901 A | 9/1999 | Nichani et al. |
| 7,034,272 B1 | 4/2006 | Leonard et al. |
| 7,469,060 B2 * | 12/2008 | Bazakos et al. ............. 382/173 |

OTHER PUBLICATIONS

Harding, K. et al., "Three Dimensional Dynamic Range Reduction Techniques", Proceedings of SPIE—The International Society for Optical Engineering, 2004, v.5265, p. 110-119, Proceedings of the Two and Three Dimensional Vision Systems for Inspection, Control and Metrology Conference, Oct. 29-30, 2003, Providence, RI.

(Continued)

*Primary Examiner*—Jose L Couso
(74) *Attorney, Agent, or Firm*—William R. Conley; Robert D. Watson

(57) ABSTRACT

Methods for segmenting the reflected light of an illumination source having a characteristic wavelength from background illumination (i.e. clutter) in structured lighting systems can comprise pulsing the light source used to illuminate a scene, pulsing the light source synchronously with the opening of a shutter in an imaging device, estimating the contribution of background clutter by interpolation of images of the scene collected at multiple spectral bands not including the characteristic wavelength and subtracting the estimated background contribution from an image of the scene comprising the wavelength of the light source and, placing a polarizing filter between the imaging device and the scene, where the illumination source can be polarized in the same orientation as the polarizing filter. Apparatus for segmenting the light of an illumination source from background illumination can comprise an illuminator, an image receiver for receiving images of multiple spectral bands, a processor for calculations and interpolations, and a polarizing filter.

20 Claims, 4 Drawing Sheets

OTHER PUBLICATIONS

Aufrere, R. et al., "Multiple Sensor Fusion for Detecting Location of Curbs, Walls and Barriers", IEEE IV2003: Intelligent Vehicles Symposium, Proceedings, 2003, pp. 126-131, $4^{th}$ Intelligent Vehicles Symposium, Jun. 9-11, 2003, Columbus Ohio.

Mertz, C. et al., "Eye-safe Laser Line Striper for Outside Use", IEEE IV2002, Proceedings of the IEEE Intelligent Vehicle Symposium, Jun. 17-21, 2002, Versailles, France, pp. 507-512, vol. 2.

Stockman, G. et al, "Sensing and Recognition of Rigid Objects Using Structured Light", IEEE Control System Magazine, Jun. 1988, vol. 8, No. 3, pp. 14-22.

DePiero, F. et al., "Design of a Structured Light Sensor for in Situ Calibration", IEEE International Conference on Intelligent Robots and Systems, 1995, v. 1, pp. 513-518. Proceedings of the 1995 IEEE/RSJ international Conference on Intelligent Robots and Systems, Part 1 (of 3), Aug. 5-9, 1995, Pittsburgh, PA.

DePiero, F. et al., "3-D Computer Vision Using Structured Light: Design, Calibration and Implementation Issues", Advances in Computers, vol. 43, 1996.

* cited by examiner

REDUCTION OF BACKGROUND CLUTTER IN STRUCTURED LIGHTING SYSTEMS

RELATED APPLICATIONS

This application claims the benefit of U.S. Provisional Application No. 60/838,603 filed on Aug. 18, 2006, the entirety of which is herein incorporated by reference.

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to structured lighting systems. The invention further relates to methods and apparatus for the suppression or reduction of background clutter in structured lighting systems. The invention additionally relates to methods and apparatus for segmenting reflected light from an illumination source, from background illumination (i.e. clutter) in a scene imaged by a structured lighting system.

BACKGROUND OF THE INVENTION

Structured lighting systems illuminate a scene with light from a source (such as a laser or light source having a characteristic wavelength) and utilize one or more imaging devices (such as a CCD camera, focal plane array, other pixilated imaging device) to observe the light from the illumination source that is reflected from objects and surfaces within the scene. The pixel location(s) in the imaging device(s) receiving reflected light can be correlated or mapped (e.g. by triangulation) to provide positional and shape based information about objects and surfaces within the scene.

Structured lighting systems are employed in applications including for example, mapping, autonomous navigation, dexterous manipulation, surveillance and reconnaissance, part inspection, geometric modeling, laser-based 3D volumetric imaging, simultaneous localization and mapping (i.e. "SLAM"), aiding first responders, and in support of soldiers with helmet-mounted laser imaging and detection and ranging (i.e. "LADAR") systems. The use of structured lighting systems can involve processing images of a scene to segment (e.g. distinguish, resolve, and/or isolate) the reflected light from an illumination source, from the background illumination of the scene. For example, image processing can be used to segment the reflected light of a laser illumination source, from background sources of illumination that can include the natural lighting of a sunlit scene, or from secondary sources (natural and manmade) of light that may occur in the scene. The success of a structured lighting application can depend on the ability of the system to segment the reflected illumination of a source, from the background illumination.

Segmenting the reflected light of an illumination source in a scene, can be problematic when the energy received from background illumination, i.e. background clutter, is on the order of, or greater than, the reflected energy from the illumination source. Segmenting the reflected light of an illumination source is further complicated when the scene comprises surfaces that are highly absorptive of the light from the illumination source, for example, as can occur in the case of asphalt surfaces. Additional complications arise when the scene is dynamic, i.e. changing or moving. For example, a scene can be spatially dynamic as in the case where the imaging device is moving relative to objects within the scene. Also, the scene can be temporally dynamic, as can be the case when the intensity of light emanating from the scene is variable. Further complications are presented when the characteristic wavelength of light emanating from the light source varies for example, as the wavelength of a laser may vary with its operating temperature.

The present invention provides methods and apparatus for segmenting the reflected light of an illumination source, from the background clutter of a scene, thereby minimizing the effects of background clutter that can impede the utilization of structured lighting systems. Embodiments of the present invention are applicable to both static and dynamic scenes and provide cures to the issues and problems discussed above.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

Figure 1A:
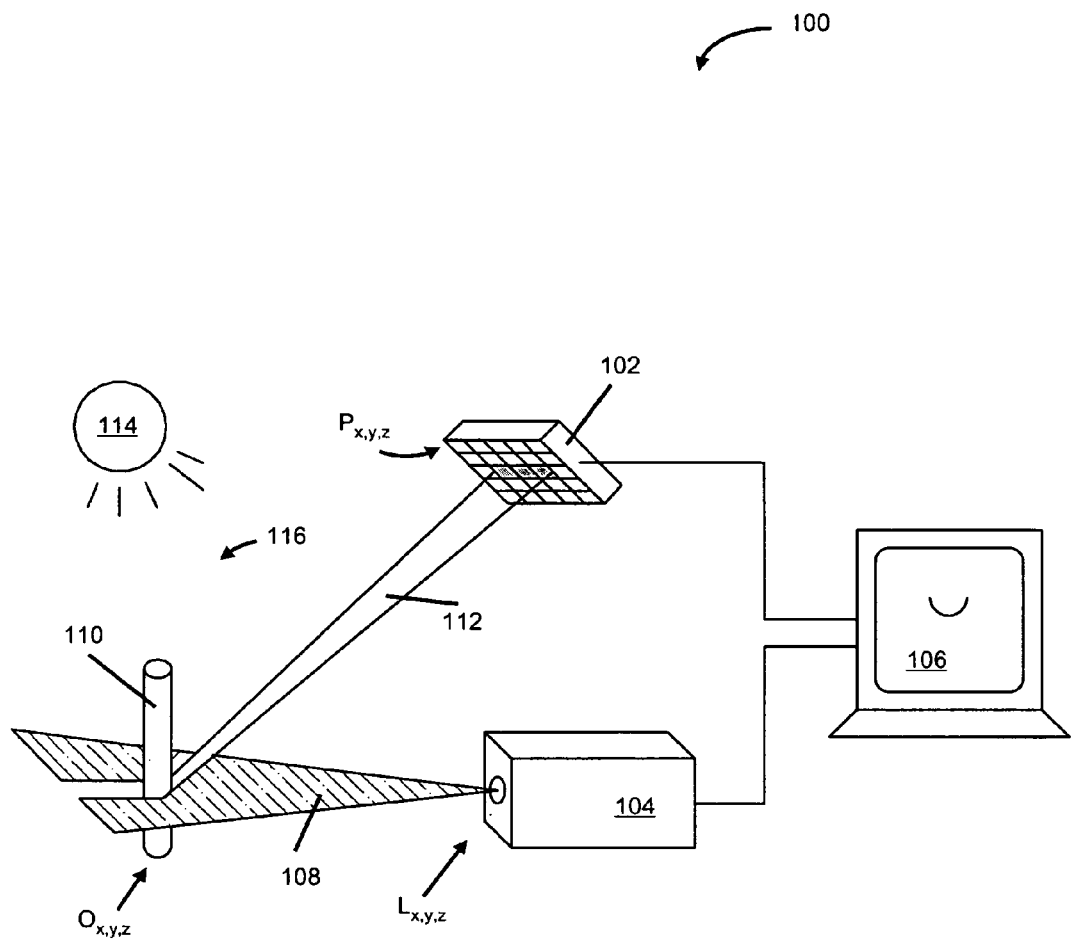
FIG. 1A is a schematic illustration of an exemplary structured lighting system.

FIG. 1A is a schematic illustration of an exemplary structured lighting system. The exemplary system 100 provides capabilities including mapping and modeling of a scene 116 in three-dimensions and can comprise a pixilated imaging device, e.g. CCD camera 102 (i.e. Charge Coupled Device) an illumination source comprising a characteristic wavelength, e.g. laser 104 and a processor 106, e.g. a computer, to process images of the scene. Processor 106 can additionally provide interfacing, control and synchronization of the components (e.g. imaging devices and illumination sources) comprising system 100. Light 108 from the laser 104 illuminates an object 110 within the scene 116. The light 112 reflected off the object 110 and imaged by the camera 102 can include contributions from the laser 104 as well as from secondary illumination sources (i.e. background clutter) such as from the sun 114.

The geometry of structured lighting systems allows one to calculate the position of the object 110 in real-world coordinates (e.g. $O_{x,y,z}$) given the real-world positions and orientations of the laser 104 (e.g. $L_{x,y,z}$) and the camera 102 and pixels (i.e. $P_{x,y,z}$) within camera that observe reflected laser light (i.e. within light 112) using triangulation methods. See for example, Stockman et al., "Sensing and Recognition of Rigid Objects Using Structured Light", Control Systems Magazine, IEEE, Vol. 8, Issue 3, June 1988, pp. 14-22, and DePiero et al., "Design of a Structured Light Sensor for In Situ Calibration", Proceedings of the 1995 IEEE/RSJ International conference on Intelligent Robots and Systems, Pittsburgh, Pa., USA, Vol. 1, pp. 513-518.

In the exemplary system 100, the laser light 108 can be projected as a spot or line and can be scanned across a scene, or projected as a pattern (e.g. a grid, line, ellipse etc.), to allow surface shapes to be deduced from the distortion of the pattern on an object's surface.

Structured lighting systems can utilize image processing to isolate, or segment, the reflected laser light from background illumination in an image of a scene. Segmenting the laser signal is difficult if the reflected laser light is not significantly brighter than the background clutter due to reflected ambient light. Under most outdoor conditions and some indoor conditions, reflected energy from background clutter can often be significantly greater than the reflected laser energy. Problems also occur when the reflective surface is highly absorptive, such as when a laser illuminates an area of asphalt. Further complications arise when the scene being imaged is dynamic.

An approach to segmenting a reflected laser signal from background clutter can be to increase the power of the laser used to examine a scene, thereby increasing the signal to noise ratio. In many applications however, it can be desired to maintain eye safe levels of laser energy as described in ANSI specification Z136.1-2000. For example, a structured lighting system as illustrated in FIG. 1A can utilize a Class IIIA laser continuously operating in the visible wavelengths with a power level of 1 mW to 5 mW, and be considered eye safe if the exposure time to the laser's energy is limited to 0.25 s or less. If it is desired to increase the power of the laser beyond 5 mW, the duty cycle or on time of the laser can be reduced below the 0.25 s exposure threshold. As an alternative to continuous operation, operating the laser in a pulsed mode, i.e. pulsing the laser beam, allows an increase in the peak output power while maintaining an eye safe average power. In the context of the invention, pulsing a light source or operating a light source in a pulsed mode is defined as controlling the duty cycle, i.e. the percentage of time light emanates from the light source, by turning the light source on and off, and/or shuttering and/or chopping the light emanating from the light source, to achieve an averaged (i.e. averaged over time) power level of light delivered to the scene that is at or below a reference level. The reference level can be a desired operational power level and/or an eye-safe power level. Illumination sources can, comprise continuous wave devices or devices comprising an operational frequency, for example, including radio frequency or higher laser light sources.

Figure 1B:
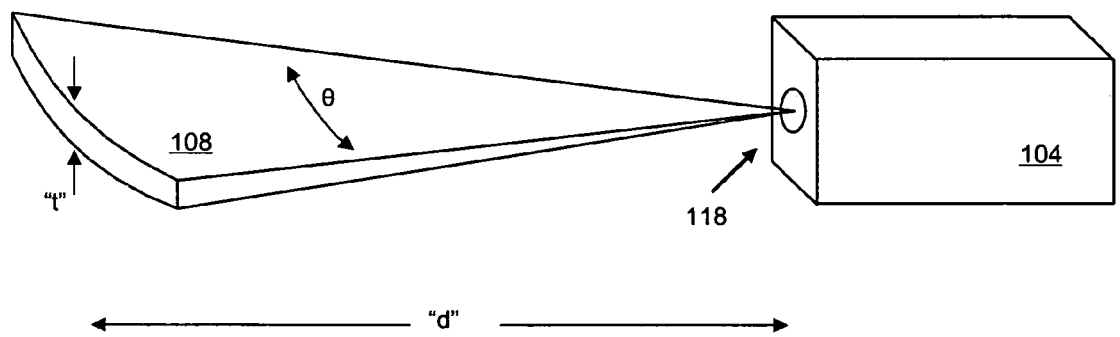
FIG. 1B is an enlarged view of the laser illumination pattern illustrated in FIG. 1A.

FIG. 1B is an enlarged view of the laser illumination pattern illustrated in FIG. 1A. In an exemplary application, a red diode laser 104 having a wavelength of 650 nm was used. It was desired to pulse the laser at a 30 Hz repetition rate (i.e. PRF=30) using a pulse width of 10 μs, and an exit lens aperture 118 of 0.7 cm. In this example, engineered controls were put into place to prevent users from coming nearer than 60 cm (i.e. "d") to the laser source. The fan-out angle (θ) of the laser beam was 45° and the width ("t") of the beam was 0.7 cm, at a 60 cm distance. Under these conditions the maximum pulse average power for 10 μs pulses at 30 Hz was determined, by the ANSI Z136.1-2000 methodology, to be 1.02 W, a considerable' increase over the allowable 5 mW for the laser when continuously operated, while maintaining eye safety. Maximum permissible pulse average powers for alternate pulse widths, distances from the source, fan-out angle, PRF and other parameters can be calculated accordingly by the methods described in ANSI Z136.1-2000.

The laser pulse (i.e. source on time) can be synchronized with the open period of the shutter of an imaging device (e.g. camera 102) to further aid segmentation. Pulsing the laser, or decreasing the duty cycle, allows for an increase in the peak power output of the laser while remaining eye safe. Additionally, if the exposure period of the imaging device (e.g. a CCD camera) is decreased, then the light collected due to background clutter is decreased. Both approaches, pulsing the illumination source and synchronizing the on time of the illumination source with the shutter open time of an imaging device, either practiced in combination or alone, can serve to increase the reflected laser light signal over background clutter, thereby increasing the signal to noise ratio for the system and facilitating segmentation of the laser signal.

In order to synchronize the laser pulse with the exposure period of a camera, a video sync separator circuit (e.g. LM1881 device, National Semiconductor, Santa Clara, Calif., USA) can be employed to determine when the CCD sensor of a camera is exposed (i.e. when the shutter is open). The video sync separator circuit can be used to extract the video sync signal from a standard National Television System Committee (i.e. NTSC) camera, allowing for the determination of how long after the vertical retrace pulse (i.e. the video sync) the camera shutter is open. A circuit can be constructed to synchronize pulsing of the laser with the video sync signal, i.e. the timing of when light from the light source illuminates a scene, is synchronized to occur within the period of time when the shutter of the camera is open. Such a circuit can be implemented stand alone, or can be incorporated within processor 106 as well.

In an exemplary application, a CCD camera was employed having a shuttering capability of 1/100,000 s (i.e. 10 μs) and a light sensitivity of 0.00015 lux, capable of either manual or electronic control of the shutter speed. Experiments were performed to determine the effectiveness of pulsing a laser synchronously with a camera shutter, in segmenting the reflected laser signal from background illumination in a scene imaged by the CCD camera. The laser was viewed using four camera exposure settings (i.e. shutter speeds) of 1/60, 1/120, 1/250 and 1/500 s and four laser power settings. As the exposure was halved, the laser power was doubled to maintain the allowable average power.

Table 1 presents the results of the experiments, for each of the four exposure settings. In this example, the power factor "X" in Table 1 was approximately 0.5 mw.

TABLE 1

Summary of Laser Pulse Power and Shutter Speed Experiments

| | Experiment # | | | |
|---|---|---|---|---|
| Parameter | 1 | 2 | 3 | 4 |
| Exposure Period (sec) | 1/60 | 1/120 | 1/250 | 1/500 |
| Laser Power | X | 2X | 4X | 8X |
| Mean Image Gray Level | 49.43 | 35.67 | 20.06 | 14.43 |
| Standard Deviation | 10.48 | 8.43 | 7.17 | 8.59 |
| Laser Gray Level | 58 | 90 | 121 | 192 |
| Signal/Noise Ratio | 0.82 | 6.44 | 14.08 | 20.66 |

As can be seen in Table 1, the signal to noise ratio in a structured lighting system can be dramatically increased by employing a pulsed laser, and synchronizing the laser pulse to the imaging camera's shutter open time. Both of which facilitate segmentation of the reflected laser signal from background clutter.

Another approach to facilitating segmentation of a reflected laser signal from background clutter can be to apply a spectral estimation technique. This technique exploits the fact that reflective properties of many manmade and natural surfaces do not vary much over narrow ranges of light wavelengths, i.e. "spectral bands" or "passbands". When a scene is illuminated by a broadband source such as the sun, the energy of light reflected off of a surface over one spectral band is approximately the same as that reflected from another nearby, but separate spectral band. In this approach, an interpolation between separate spectral bands is used to determine the intensity of light in a neighboring spectral band.

For example, consider three separate spectral bands that are centered about a lower wavelength $\lambda_L$ a middle wavelength $\lambda_M$ and a higher wavelength $\lambda_H$. The gray level intensity (as viewed by an imaging device) of light Y within the spectral band centered about wavelength $\lambda_M$, received by an imaging device at a pixel element (i,j) can be estimated, i.e. $Y_{i,j}$(est.) by linear interpolation of the gray level light intensity values $X_{i,j}$ and $Z_{i,j}$ received by the pixel element at the lower and higher spectral bands respectively, by the relation:

$$Y_{ij}(\text{est.}) = k_0 + k_1 X_{ij} + k_2 Z_{ij} \quad (1)$$

The constant $k_0$ represents the DC offset within the imaging device and the constants $k_1$ and $k_2$ are the weights given the gray level light intensities for the lower and higher spectral bands, and are determined as described in the following.

In an exemplary application, the wavelength of a laser, i.e. the wavelength of light or a characteristic wavelength of light emanating from the light source, falls within the middle spectral band centered about $\lambda_M$ and is outside the range of the lower and upper spectral bands. In this scenario, the estimated light intensity $Y_{i,j}$(est.) does not does not include the laser signal due to the lack of correlation in the neighboring bands (i.e. the neighboring bands do not include an intensity contribution at the wavelength of the laser). Therefore, differencing between the actual response (i.e. the actual or received image intensity) at the middle spectral band and, the estimated response at the middle spectral band, subtracts out the background clutter (i.e. including light from secondary sources) from the image of the scene obtained at the middle spectral band and, allows for segmentation of the received laser signal from the background clutter.

The following equation calculates the error $e_{i,j}$ between the estimated image $Y_{i,j}$(est.) and the actual image intensity $Y_{i,j}$:

$$e_{ij} = Y_{ij}(\text{est.}) - Y_{ij} \quad (2)$$

A least squares estimate can be used to calculate the coefficients $k_0$, $k_1$ and $k_2$:

$$E = \sum_{ij} e_{ij}^2 = \sum_j \sum_i (k_0 + k_1 X_{ij} + k_2 Z_{ij} - Y_{ij})^2 \quad (3)$$

$$\frac{\partial E}{\partial k_0} = 2 \sum_j \sum_i (k_0 + k_1 X_{ij} + k_2 Z_{ij} - Y_{ij}) = 0 \quad (4)$$

$$\frac{\partial E}{\partial k_1} = 2 \sum_j \sum_i (k_0 + k_1 X_{ij} + k_2 Z_{ij} - Y_{ij}) X_{ij} = 0 \quad (5)$$

$$\frac{\partial E}{\partial k_2} = 2 \sum_j \sum_i (k_0 + k_1 X_{ij} + k_2 Z_{ij} - Y_{ij}) Z_{ij} = 0 \quad (6)$$

Using Cramer's rule the following equations for $k_0$, $k_1$ and $k_2$ are calculated. In this solution "det" is equal to the determinant of A and, $$NM = \sum_{i,j} = 1$$

is the number of pixels in the image taken from the camera.

$$Ax = b \rightarrow \begin{bmatrix} NM & \sum_{ij} X_{ij} & \sum_{ij} Z_{ij} \\ \sum_{ij} X_{ij} & \sum_{ij} X_{ij}^2 & \sum_{ij} X_{ij} Z_{ij} \\ \sum_{ij} Z_{ij} & \sum_{ij} X_{ij} Z_{ij} & \sum_{ij} Z_{ij}^2 \end{bmatrix} \begin{bmatrix} k_0 \\ k_1 \\ k_2 \end{bmatrix} = \begin{bmatrix} \sum_{ij} Y_{ij} \\ \sum_{ij} Y_{ij} X_{ij} \\ \sum_{ij} Y_{ij} Z_{ij} \end{bmatrix} \quad (7)$$

$$x = A^{-1} b \rightarrow \begin{bmatrix} k_0 \\ k_1 \\ k_2 \end{bmatrix} = \begin{bmatrix} NM & \sum_{ij} X_{ij} & \sum_{ij} Z_{ij} \\ \sum_{ij} X_{ij} & \sum_{ij} X_{ij}^2 & \sum_{ij} X_{ij} Z_{ij} \\ \sum_{ij} Z_{ij} & \sum_{ij} X_{ij} Z_{ij} & \sum_{ij} Z_{ij}^2 \end{bmatrix}^{-1} \begin{bmatrix} \sum_{ij} Y_{ij} \\ \sum_{ij} Y_{ij} X_{ij} \\ \sum_{ij} Y_{ij} Z_{ij} \end{bmatrix} \quad (8)$$

The following is the solution for each coefficient:

$$k_0 = \frac{\begin{vmatrix} \sum_{ij} Y_{ij} & \sum_{ij} X_{ij} & \sum_{ij} Z_{ij} \\ \sum_{ij} Y_{ij} X_{ij} & \sum_{ij} X_{ij}^2 & \sum_{ij} X_{ij} Z_{ij} \\ \sum_{ij} Y_{ij} Z_{ij} & \sum_{ij} X_{ij} Z_{ij} & \sum_{ij} Z_{ij}^2 \end{vmatrix}}{\det} \quad (9)$$

$$k_1 = \frac{\begin{vmatrix} NM & \sum_{ij} Y_{ij} & \sum_{ij} Z_{ij} \\ \sum_{ij} X_{ij} & \sum_{ij} Y_{ij} X_{ij} & \sum_{ij} X_{ij} Z_{ij} \\ \sum_{ij} Z_{ij} & \sum_{ij} Y_{ij} Z_{ij} & \sum_{ij} Z_{ij}^2 \end{vmatrix}}{\det}$$

$$k_2 = \frac{\begin{vmatrix} NM & \sum_{ij} X_{ij} & \sum_{ij} Y_{ij} \\ \sum_{ij} X_{ij} & \sum_{ij} X_{ij}^2 & \sum_{ij} Y_{ij} X_{ij} \\ \sum_{ij} Z_{ij} & \sum_{ij} X_{ij} Z_{ij} & \sum_{ij} Y_{ij} Z_{ij} \end{vmatrix}}{\det}$$

In an exemplary application of the spectral estimation method, a laser spot source with a wavelength of 650 nm was used to illuminate a portion of a scene that was separately imaged by a CCD camera having 256 gray levels of resolution, through three spectral filters. The three spectral filters having passbands centered about the wavelengths of 600 nm, 650 nm and 700 nm. All three spectral filters had a spectral bandwidth of 40 nm. The passbands were therefore 600 nm+/−20 nm, 650 nm+/−20 nm and 700 nm+/−20 nm. Note that the laser wavelength is not within the passbands of the low wavelength filter (600 nm) and the high wavelength filter (700 nm). Three images of the scene were acquired, one at each passband, with the laser on. As described above, interpolation of the image intensities acquired at the 600 nm (low) and 700 nm (high) spectral bands was used to estimate the intensity of the background clutter in the image acquired using the 650 nm (middle) filter. Differencing was then used between the actual 650 nm image and the estimated response at 650 nm, to subtract out the background clutter from the actual 650 nm image (i.e. to obtain a "differenced image") to segment the laser signal from the background clutter in the scene.

The mean gray level (intensity) of the actual image acquired with the 650 nm filter was 140.5 with a standard deviation of 44.9. The laser gray level in this image was 255 which is only ~2.56 standard deviations above the mean gray level (i.e. signal to noise ratio of 255/140.5~2). For the differenced image, the mean gray level was 6.37 with a standard deviation of 5.49. The laser gray level in the differenced image was 121, ~21 standard deviations above the mean (i.e. signal to noise ratio of 121/6.37~19). This example serves to illustrate the substantial increase in signal to noise ratio (i.e. ease in segmenting the laser signal) that can be achieved with the spectral estimation technique. It has been observed, under a wide variety of backgrounds and using the filters with characteristics as described above, that the least-squares estimates of coefficients is often near to $k_0=0$, $k_1=\frac{1}{2}$ and $k_2=\frac{1}{2}$.

The spectral estimation method can be employed where multiple images of a scene are acquired, each image comprising light intensity values for corresponding locations within the scene and, each image comprises a spectral band. In the simplest case, one image comprises a spectral band that includes the wavelength of light characteristic of the illumination source, and two additional images comprise spectral bands that do not include the characteristic wavelength of the illumination source. The contribution of background clutter to the light intensity in the image that comprises the characteristic wavelength of the illumination source, is estimated by interpolation (e.g. by the spectral estimation method described above) of images that do not include the characteristic wavelength of the illumination source. The estimated contribution due to background clutter can then be subtracted from the image that includes the wavelength of light characteristic of the illumination source, thereby segmenting the light of the illumination source from background clutter. The estimation and subtraction of the contribution due to background clutter can be done on a location by location basis within the scene, as viewed in the images obtained from the imaging device, and can be done on a pixel by pixel basis as described above, or as well could be accomplished for logical groupings of pixels.

Another approach to segmenting a laser signal from background clutter can be to utilize a polarizing filter inserted between the imaging device, and the scene being observed. This approach can include utilizing an illumination source providing light that is polarized in substantially along the same orientation as the orientation of the polarization filter. Most natural light (i.e. sunlight) occurs in a random, unpolarized state. The unpolarized light can become totally or partially linearly polarized when reflected by a surface. It will become circularly polarized only if the linearly polarized light subsequently passes through certain types of objects in specific situations. Because of this, circular polarization is not common in nature. Unpolarized light when reflected by a surface will generally be somewhat linearly polarized. There can be cases in which there will be no polarization, such as when the light is totally reflected or when the angle of incidence is 90°. The degree of polarization of the reflected light will vary according to the characteristics of the surface and the angle of incidence. The degree of polarization is maximized at an angle of incidence equal to what is known as "Brewster's angle".

The nature of the reflective surface can affect the polarization state of reflected (initially unpolarized) light. Unpolarized light becomes partially linearly polarized when reflected by a smooth non-metallic surface, and in favorable situations total polarization can result. In the case of rough surfaces, the reflected light will be linearly polarized, but can have orientations other than horizontal. The degree of polarization caused by a rough surface is usually smaller than that produced by smooth surfaces, because of the multiple reflections in the irregularities of the rougher surface.

When linearly polarized, light is reflected off a non-metallic smooth, horizontal surface, the horizontal component of the incident light is strongly reflected while the vertical component is decreased and becomes zero at the Brewster angle. For angles of incidence smaller than the Brewster angle, a mirror effect occurs and a shift of 90° in the polarization shows up in the reflected light. This occurs due to a phase-shift of the vertically polarized component. However, this change has no effect on the horizontal component. Rough surfaces produce a depolarization when reflecting linearly polarized incident light. However, some of the original polarization still remains. The depolarization is stronger in bright rough surfaces than in dark rough surfaces.

Based on these observations, an optical system can be designed to minimize the collected intensity from reflected sunlight (i.e. background clutter) relative to the collected intensity from an illumination source; such as a laser. In order to do this a polarizer can be used, oriented at an angle that is substantially orthogonal to the polarization angle of the reflected sunlight. Since an objective is to reduce the background clutter originating for example, from the sun's illumination of a scene, it can be desirable that the reflected linearly polarized sunlight have a different (e.g. orthogonal) angle with respect to the reflected linearly polarized light due to a laser signal.

For example, the total intensity of light detected by an imaging device (e.g. a CCD camera) can be defined as the sum of the light's horizontal and vertical intensity (i.e. polarization) components:

$$I = I_H + I_V \tag{10}$$

If R is defined as the ratio between the horizontal and the vertical components, (10) can be written as:

$$I = (1+R) \times I_V \tag{11}$$

where:

$$R = \frac{I_H}{I_V} \tag{12}$$

If a vertically oriented polarizer is placed in front of the camera, the intensity of light detected ($I_{pol}$) will correspond only to the vertical component:

$$I_{pol} = I_V \tag{13}$$

The signal to clutter ratio (STC) in the imaging laser system is defined as:

$$STC = \frac{I_L}{I_S} \tag{14}$$

where:
  $I_L$ is equal to the laser light intensity detected by the camera;
  $I_S$ is equal to the sunlight intensity detected by the camera, in the same area of the scene as the laser spot.

The improvement (IMP) in the signal to clutter ratio that can be obtained by using polarization in the system is defined by the ratio between the signal to clutter ratio with a polarizer ($STC_{pol}$) and without the polarizer (STC):

$$IMP = \frac{STC}{STC_{pol}} = \frac{\frac{I_{Vlaser}}{I_{Vsun}}}{\frac{(1+R_{laser}) \times I_{Vlaser}}{(1+R_{sun}) \times I_{Vsun}}} \text{ and,} \quad (15)$$

$$IMP = \frac{1+R_{sun}}{1+R_{laser}} \quad (16)$$

where:

$R_{sun}$ is the ratio between the horizontal and the vertical intensity components of the reflected sunlight;

$R_{laser}$ is the ratio between the horizontal and the vertical intensity components of the reflected laser light;

$I_{Vsun}$ is the intensity of the vertical component of the reflected sunlight;

$I_{Vlaser}$ is the intensity of the vertical component of the reflected laser light.

Therefore, the improvement that can be achieved by placing a vertical polarizer in the field of view of the CCD camera depends only on $R_{sun}$ and $R_{laser}$. For an IMP greater than unity, $R_{sun}$ has to be greater than $R_{laser}$.

The same development can be done for any angle of orientation for the polarization filter. A vertical polarizer is illustrated as sunlight reflected from a scene is generally, more horizontally, than vertically oriented. Therefore, by using a vertical polarizer at the camera, the intensity of sunlight at the detector is less than if a horizontal polarizer were used. Additionally, in order to maximize the improvement (i.e. signal to clutter ratio) a vertically polarized laser can be used in conjunction with a vertically oriented polarizer in front of the camera. With this configuration the lowest value for $R_{laser}$ is obtained.

Figure 2:
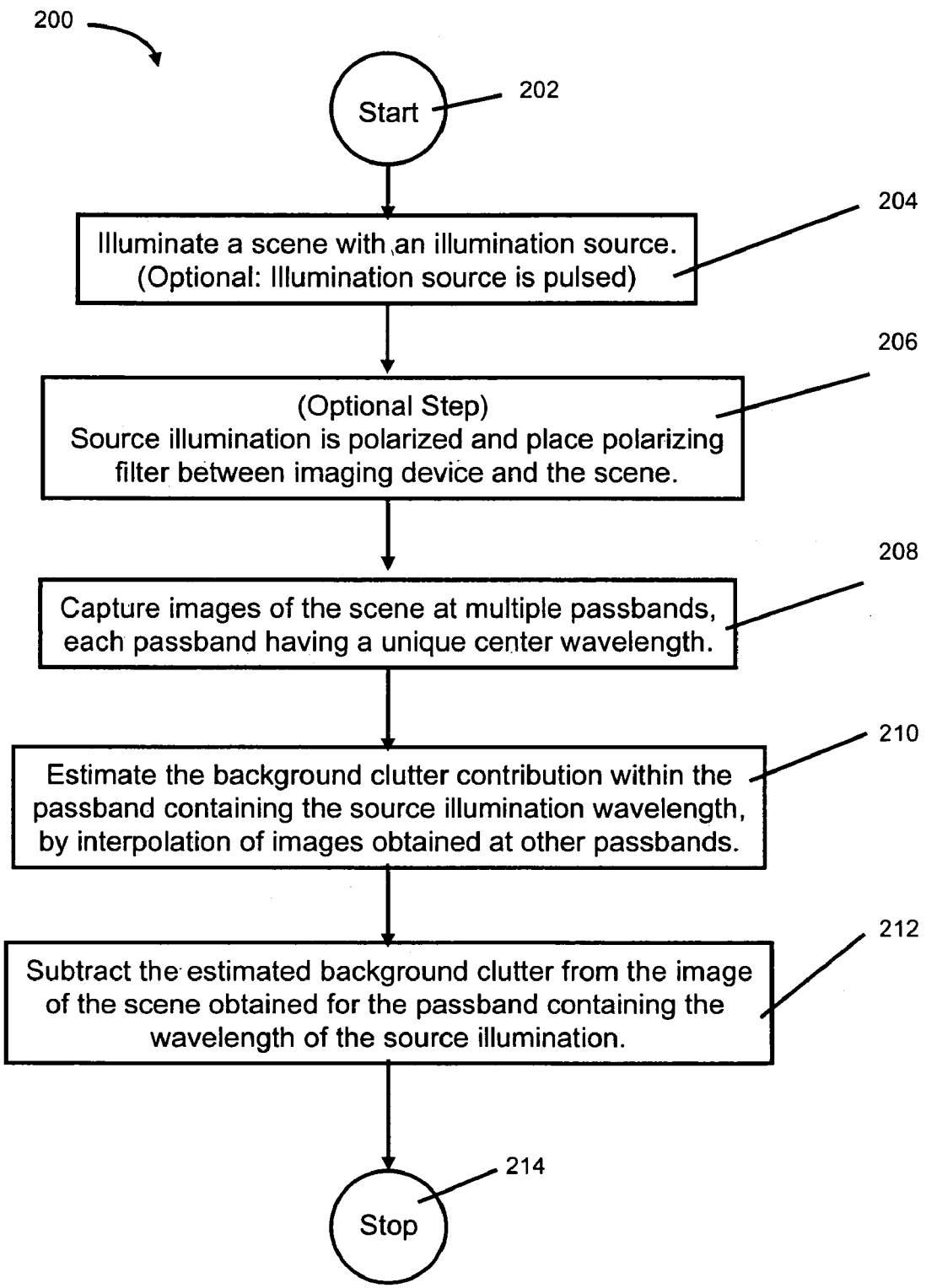
FIG. 2 is a flow chart of an embodiment of a method according to the present invention.

FIG. 2 illustrates an embodiment of a method 200 according to the present invention, which can be practiced for example, utilizing a structured lighting system as illustrated in FIG. 1. Method 200 begins at step 202. At step 204 a scene is illuminated with light from an illumination source. The illumination source can optionally be operated in a pulsed mode and, the pulses of light from the illumination source can be synchronized to occur during the open times of a shutter in an imaging device. The illumination source can comprise for example, a laser, producing light having a characteristic wavelength ($\lambda_C$). At step 208 multiple images of the scene are received by an imaging device (e.g. "captured") each image comprising a spectral band of wavelengths.

In this exemplary embodiment three images of the scene are captured, one comprising a spectral band of light centered at a wavelength lower than the characteristic wavelength of the source illumination, another comprising a spectral band of light centered at the characteristic wavelength of the source illumination, and a third spectral band of light centered at a wavelength of light higher than the characteristic wavelength of the source illumination. The spectral bands can be chosen (e.g. by selection of filters) such that the lower and upper passbands do not contain the characteristic wavelength of the illumination source. Captured images can comprise contributions of light, including light from the illumination source reflected from the scene, light from background, i.e. secondary illumination sources of the scene and, light from background illumination sources directly entering an imaging device, i.e. the latter two contributing to background clutter.

In applications of the method 200 where the scene is dynamic (e.g. the camera is moving or the light intensity emanating from the scene is time varying) it can be beneficial to capture the images of the scene at each of the spectral bands simultaneously. Simultaneously capturing images is defined as capturing multiple images over a period of time small enough such that objects in the scene move less than an amount on the order of the spatial resolution of the system and/or, the intensity of light emanating from the scene varies less than an amount on the order of the temporal resolution of the system. Simultaneous capture of images comprising separate spectral bands can be achieved for example, by imaging the scene with multiple imaging devices, each imaging device comprising a spectral filter having a passband, and/or using a single imaging device comprising multiple CCD arrays each CCD array receiving a separate spectral band (e.g. as in some color CCD cameras comprising a beam splitting prism) and/or using an imaging device comprising a pixilated array wherein the pixels are grouped as in a "Bayer" color filter array (e.g. as in some lower cost color CCD cameras).

At step 210 the contribution of light due to background clutter is estimated for the image, containing the characteristic wavelength of the source illumination, by interpolation of the two images comprising spectral bands that do not include the characteristic wavelength of the source illumination, for example, by the spectral estimation (i.e. interpolation) method described above.

At step 212, the estimated background contribution is subtracted from the image containing the characteristic wavelength of the source illumination, thereby segmenting the reflected source illumination signal from the background clutter in the image. The method ends at step 214.

In alternative embodiments of the invention, multiple images captured for more than three passbands of light can be utilized if desired in an application, and the spectral estimation technique modified accordingly (e.g. by interpolation of more than two data sets). Additionally, it is not necessary for the interpolated data sets (i.e. interpolated images) to comprise passbands of higher and lower wavelengths than the illumination source. For example, two data sets could be interpolated that comprise spectral bands each being higher or each being lower in wavelength, than the illumination source and, the resulting background estimation extrapolated to the characteristic wavelength of the illumination source, using the methods described above.

Optionally the method can comprise at step 206, a polarized illumination source and a polarization filter inserted in front of the imaging device (as described above) to further enhance segmentation of the source illumination wavelength from background clutter. The polarizer in front of the imaging device can be oriented substantially orthogonal to horizontal surfaces within the scene and can additionally be oriented in a direction substantially parallel to the polarization of the illumination source. Inclusion of optional step 206 can be beneficial, in applications where the background light reflected from surfaces within the scene is generally horizontally polarized.

Figure 3:
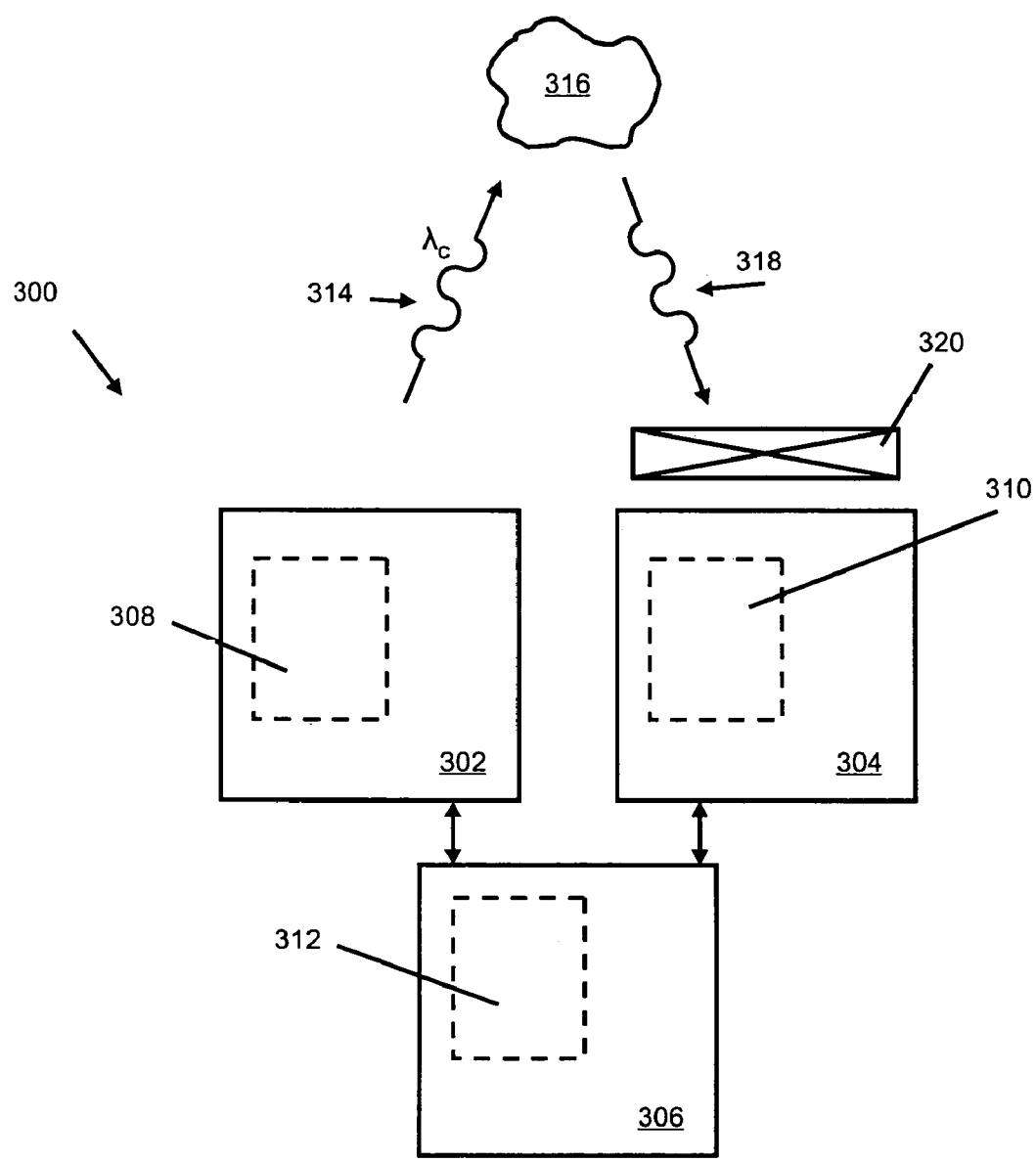
FIG. 3 is a schematic block diagram illustration of an embodiment of an apparatus according to the present invention.

FIG. 3 is a schematic block diagram illustration of an embodiment of an apparatus 300 according to the present invention. Apparatus 300 comprises an illumination source 302 arranged to provide light 314 comprising a characteristic wavelength ("$\lambda_c$"), to a scene 316. A receiver 304 receives light 318 from the scene and can capture images of the scene. Light 318 can comprise contributions of light 314 from the illumination source 302 as well as direct and reflected light due to background illumination sources (not shown). A processor 306 is connected to the illumination source 302 and the receiver 304.

System 300 can include a pulsing module 308 or similar device, that can be coupled to the illumination source 302 (for example a laser) to operate the illumination source 302 in a pulsed mode (as defined above). System 300 can also include a shutter 310 or similar device that can be coupled to the imaging device 304 (for example a CCD camera): Processor 306 (for example a computer or a multiple of processing modules) can be operatively arranged to control the illumination source 302 and the receiver 304 and can include a syncing module 312, to synchronize pulses of light from the illumination source 302 with the open time of a shutter 310 coupled to the receiver 304. Processor 306 can additionally be arranged to perform the spectral estimation methods described above, and provide processed images to a display (not shown). Furthermore, where the light 314 from the illumination source is polarized, a polarizing filter 320 can be disposed between the scene 316 and the receiver 320. In the latter case, it can be advantageous to orient the polarizing filter 320 substantially parallel to the polarization orientation of the light 314.

Simultaneous capture of multiple images comprising separate spectral bands, as Can be desired when the scene is dynamic, can be achieved by imaging the scene with multiple imaging devices (i.e. receiver 304 can comprise multiple pixilated arrays) each imaging device comprising a spectral filter having a passband, and/or using a single imaging device comprising multiple CCD arrays each CCD array receiving a separate spectral band (e.g. as in some color CCD cameras comprising a beam splitting prism) and/or using an imaging device comprising a pixilated array wherein the pixels are grouped as in a "Bayer" color filter array (e.g. as in some lower cost color CCD cameras).

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. A method for segmenting light from an illumination source from background light, in images of a scene obtained by a structured lighting system, the method comprising:

illuminating the scene with light from the illumination source, the light from the illumination source comprising a first wavelength;

receiving by an imaging device,
  a first image of the scene comprising a first spectral band, the first spectral band including the first wavelength,
  a second image of the scene comprising a second spectral band, the second spectral band not including the first wavelength,
  a third image of the scene comprising a third spectral band, the third spectral band not including the first wavelength, and
  each of the first, second and third images comprising light intensity values for corresponding locations within the scene;

calculating, using a computer processor, estimated light intensity values due to background light, for one or more locations as viewed in the first image, by interpolation of the light intensity values for the corresponding locations as viewed in the second and third images; and subtracting, using the computer processor, the estimated light intensity values due to background light from the light intensity values for the one or more locations as viewed in the first image.

2. The method of claim 1 including the step of operating the illumination source in a pulsed mode, thereby illuminating the scene with pulses of light from the illumination source.

3. The method of claim 2 wherein the imaging device comprises a shutter, and including the step of synchronizing the pulses of light illuminating the scene to occur when the shutter is open.

4. The method of claim 1 wherein the second spectral band is centered about a second wavelength, the third spectral band is centered about a third wavelength, and the second wavelength is not equal to the third wavelength.

5. The method of claim 4 wherein the first spectral band is centered about the first wavelength, the first wavelength is greater than the second wavelength, and the first wavelength is less than the third wavelength.

6. The method of claim 1 wherein the scene is one or more selected from the group consisting of a spatially dynamic scene and a temporally dynamic scene.

7. The method of claim 6 wherein multiple images of the scene are received substantially simultaneously.

8. The method of claim 1 wherein the illumination source comprises a laser.

9. A method for segmenting light from a pulsed illumination source, from background light, in images of a scene obtained by a structured lighting system, the method comprising:

illuminating the scene with pulses of light from the pulsed illumination source, the pulses of light from the illumination source comprising a first wavelength, and the pulses of light from the illumination source being polarized in a first orientation;

receiving by an imaging device comprising a polarization filter,
  a first image of the scene comprising a first spectral band, the first spectral band including the first wavelength,
  a second image of the scene comprising a second spectral band, the second spectral band not including the first wavelength,
  a third image of the scene comprising a third spectral band, the third spectral band not including the first wavelength,
  each of the first, second and third images comprising light intensity values for corresponding locations within the scene and, wherein the polarizing filter has a second orientation, the second orientation being substantially aligned to the first orientation;

calculating, using a computer processor, estimated light intensity values due to background light, for one or more locations as viewed in the first image, by interpolation of the light intensity values for the corresponding locations as viewed in the second and third images; and subtracting, using the computer processor, the estimated light intensity values due to background light from the light intensity values for the one or more locations as viewed in the first image.

10. The method of claim 9 wherein the pulsed illumination source comprises a laser.

11. The method of claim 9 wherein the imaging device comprises a shutter, and including the step of synchronizing the pulses of light illuminating the scene to occur when the shutter is open.

12. The method of claim 9 wherein the second spectral band is centered about a second wavelength, the third spectral band is centered about a third wavelength, and the second wavelength is not equal to the third wavelength.

13. The method of claim 12 wherein the first spectral band is centered about the first wavelength, the first wavelength is greater than the second wavelength, and the first wavelength is less than the third wavelength.

14. The method of claim 9 wherein the scene is one or more selected from the group consisting of a spatially dynamic scene and a temporally dynamic scene.

15. The method of claim 14 wherein multiple images of the scene are received substantially simultaneously.

16. A structured lighting system for segmenting light provided to a scene from background light in images of the scene, the system comprising:
  an illumination source for providing light comprising a first wavelength, to the scene;
  a receiver comprising an imaging device, the receiver operatively arranged to receive,
    a first image of the scene comprising a first spectral band, the first spectral band including the first wavelength,
    a second image of the scene comprising a second spectral band, the second spectral band not including the first wavelength,
    a third image of the scene comprising a third spectral band, the third spectral band not including the first wavelength, and
    each of the first, second and third images comprising light intensity values for corresponding locations within the scene;
  a processor connected to the illuminator and the receiver, the processor operatively arranged to calculate estimated light intensity values due to background light for one or more locations in the first image, by interpolation of the light intensity values for the corresponding locations as viewed in the second and third images and, the processor operatively arranged to subtract the estimated light intensity values due to background light from the light intensity values for the one or more locations as viewed in the first image.

17. The system of claim 16 comprising a polarizing filter disposed between the scene and the receiver, and wherein the illumination source provides light that is polarized in an orientation substantially parallel to the orientation of the polarizing filter.

18. The system of claim 16 wherein the illumination source comprises a laser.

19. The system of claim 16 wherein the illumination source comprises a pulsing module, the imaging device comprises a shutter, and the processor comprises a synchronizing module; the synchronizing module operatively arranged to cause the illumination source to produce pulses of light during open periods of the shutter.

20. The system of claim 16 wherein the receiver comprises one or more imaging devices selected from the group consisting of a CCD camera having a spectral filter, a CCD camera comprising multiple CCD arrays and a prism, and a pixilated array wherein the pixels are arranged in a Bayer color filter array.

* * * * *